(12) United States Patent
Morita et al.

(10) Patent No.: US 6,369,167 B1
(45) Date of Patent: Apr. 9, 2002

(54) POLYMER, PROCESS FOR MAKING THE POLYMER, AND RUBBER COMPOSITION USING THE POLYMER

(75) Inventors: Koichi Morita; Hajime Kondo, both of Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/453,524

(22) Filed: Dec. 3, 1999

(51) Int. Cl.$^7$ .................................................. C08F 8/30
(52) U.S. Cl. ................. 525/342; 525/332.8; 525/332.9; 525/333.1; 525/333.2
(58) Field of Search .......................................... 525/342

(56) References Cited

U.S. PATENT DOCUMENTS 5,331,018 A * 7/1994 McGinniss et al. ......... 525/342

FOREIGN PATENT DOCUMENTS

| EP | 299074 | 1/1989 |
|----|--------|--------|
| EP | 451604 | 10/1991 |
| JP | 09111220 | * 4/1997 |

* cited by examiner

Primary Examiner—Bernard Lipman
(74) Attorney, Agent, or Firm—SUGHRUE MION, PLLC

(57) ABSTRACT

The object of the present invention is to provide a modified diene polymer capable of creating good reinforcing characteristics and filler dispersing effect independently of the kinds of the filler as well as a process for making the polymer and to provide a rubber composition having good fracture characteristics, wear resistance, and low exothermicity without the impairment of wet performance. The above-described object can be achieved by a process for making the polymer, said process comprising the steps of polymerizing or copolymerizing a conjugated diene monomer by using an organolithium compound as an initiator in a hydrocarbon solvent and thereafter allowing the active termination of the polymer to react with a compound having an alkylideneamino group represented by the following formula 1;

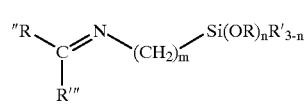

Formula 1 wherein R, R', R", and R'" each represent a group having 1 to 18 carbon atoms selected from the group consisting of: an alkyl group, an allyl group, or an aryl group; and m and n are integers of from 1 to 20 and from 1 to 3, respectively.

12 Claims, No Drawings

POLYMER, PROCESS FOR MAKING THE POLYMER, AND RUBBER COMPOSITION USING THE POLYMER

BACKGROUND OF THE INVENTION

1. Field of the Invention

The present invention relates to a process for making a polymer, in which fracture characteristics, wear resistance, and low exothermicity are maintained simultaneously at a very favorable level, the polymer obtained by the process, and a rubber composition using the polymer. More specifically, the present invention relates to a process for making a modified diene polymer in which a terminal of a polymer obtained by an anionic polymerization is modified so that the interaction with silica or carbon black is strengthened, a polymer obtained by the process, and a rubber composition using the polymer.

2. Description of the Related Art

In connection with the movement to regulate carbon dioxide emission on a worldwide level because of growing concerns about environmental problems, a demand for automobiles with lower fuel consumption is becoming more urgent. In order to comply with such a demand, reduction of rolling resistance is required in terms of the performance of tires. As for means to reduce the rolling resistance of tires, although the optimization of tire structure has been researched, the most commonly adopted means is to utilize a rubber composition having low exothermicity.

In order to obtain a rubber composition having low exothermicity, many technical developments have been made so as to increase the dispersibility of fillers for use in rubber compositions. Among these technologies, the most common is the method wherein a terminal of a polymer obtained by an anionic polymerization using an alkyllithium is modified with a functional group capable of having an interaction with a filler.

The most typical method known as the above-mentioned means is a method wherein carbon black is used as the filler and a polymer terminal is modified with a tin compound (Japanese Patent Application Publication (JP-B) No. 5-87, 530). Also known is a method wherein carbon black is used as a filler and an amino group is introduced into a polymer terminal (Japanese Patent Application Laid-Open (JP-A) No. 62-207,342).

Further, with the recent increase in interest in the safety of automobiles, demands regarding performance on a wet road (hereinafter referred to as wet performance), breaking performance in particular, are growing, in addition to the demand for low fuel consumption. Therefore, what is required of a rubber composition for a tire tread is not only the reduction of the rolling resistance but also the realization of achieving high levels of wet property and low fuel consumption simultaneously, at a high level.

As a method for obtaining a rubber composition capable of imparting satisfactory low fuel consumption and wet performance simultaneously to tires, a method wherein silica is used as a reinforcing filler in place of traditionally used carbon black has already been put into practice.

It has become clear, however, that the use of silica as a reinforcing filler significantly lowers the breaking strength and wear resistance of a rubber composition in comparison with the use of carbon black. Furthermore, because of the poor dispersibility of silica, kneading processability, when silica is used, presents a serious problem during the actual production of tires.

Accordingly, in order to obtain a rubber composition that has low exothermicity and provides good productivity, it is required to use a combination of silica and carbon black instead of using carbon black or silica separately, and to provide a terminal modified polymer which exhibits an interaction with a wide variety of such fillers, thereby providing good dispersibility of the fillers and good wear resistance of the rubber composition.

However, since attempts have been mostly made to develop a modifier aiming at the use of a single filler in the above-described means, the availability of a terminal modified polymer that exhibits a sufficient interaction with a filler regardless of the type of the filler is extremely limited.

For example, the tin compound, which has been mentioned above, demonstrates a large dispersing effect with carbon black, but with respect to silica, demonstrates only a minimal dispersing effect and no reinforcing effect at all.

Methods using an alkoxysilane, which is effective in the improvement of dispersibility and reinforcing property of silica, are described, for example, in JP-A Nos. 1-188,501, 8-53,5153, and 8-53,576. It is clear however, that these methods are not effective when carbon black is used as a filler, because the alkoxysilyl group exhibits no interaction with a carbon black at all. The same can be said of other modified polymers for use with silica. For example, methods that use aminoacrylamide, described in JP-A Nos. 9-71,687 and 9-208,633, have neglible effects in the improvement of the dispersion of carbon black, although these methods have a certain effect in the improvement of the dispersion of silica. An additional problem associated with these methods is that, when these methods are applied to a rubber composition comprising a combination of carbon black and silica or to a rubber composition comprising carbon black, the hysteresis of the composition becomes larger.

A method, in which a terminal of a polymer, which is obtained by a polymerization reaction using a lithium amide initiator, is modified with an alkoxysilane, has been employed recently in order to enhance the effect of modification (JP-A No. 9-208,621). However, this method requires a fairly expensive initiator and is known to be not perfectly free from the problems with regard to processability of rubber compositions, despite its effectiveness in improving dispersion and reinforcement.

A modified polymer that is prepared by using a modifier composed of an alkoxysilane having a dialkylamino group introduced thereinto has been reported (JP-B Nos. 6-53,763 and 6-57,767). This method brings about good processability and a reinforcing effect when silica is used, and a certain level of dispersing effect for both silica and carbon black. However, the disadvantage of this method is that, since the amino group is a dialkyl group which is less effective with carbon black, the effect of this method is not sufficiently exhibited in a rubber composition, in particular in a rubber composition containing a large proportion of carbon black, in comparison with methods utilizing a tin-based modifier.

SUMMARY OF THE INVENTION

It is accordingly an object of the present invention to provide a modified diene polymer which exhibits good reinforcing characteristics and filler dispersing effect regardless of the kinds of the fillers, a method for making the diene polymer, and a rubber composition having good fracture characteristics, wear resistance, and low exothermicity, without the impairment of the wet performance, by upgrading the interactions with both carbon black and silica of the modified diene polymer in a simultaneous manner which has been difficult to obtain by methods hitherto known.

After extensive studies to obtain a polymer having excellent interaction with the above-mentioned various fillers, the present inventors have found that the use, as a terminal modifier of a polymer, of a compound having an imino group

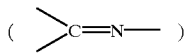

exhibiting a specifically good interaction with both carbon black and silica makes it possible to obtain a very good effect in comparison with the polymers obtainable by known techniques.

Accordingly, the present invention has the following constitution among others.

(1) A process for manufacturing a polymer, said process comprising steps of polymerizing or copolymerizing a conjugated diene monomer by using an organolithium compound as an initiator in a hydrocarbon solvent, and thereafter allowing the active terminal of the polymer to react with a compound having an imino group represented by the following formula 1;

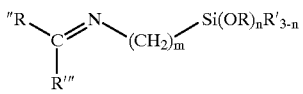

Formula 1 wherein R, R', R", and R''' each independently represents a group having 1 to 18 carbon atoms selected from the group consisting of: an alkyl group, an allyl group, and an aryl group; m and n are integers of from 1 to 20 and from 1 to 3, respectively.

(2) The process for manufacturing a polymer according to (1) wherein the polymer is a copolymer of a conjugated diene monomer with a monovinyl aromatic compound.

(3) The process for manufacturing a polymer according to (2) wherein the conjugated diene monomer and the monovinyl aromatic hydrocarbon monomer are butadiene and styrene, respectively.

(4) The process for manufacturing a polymer according to (1) wherein the imino group is a group selected from the group consisting of: ethylideneamino group, 1-methylpropylideneamino group, 1,3-dimethylbutylideneamino group, 1-methylethylideneamino group, and 4-N,N-dimethylaminobenzylideneamino group.

(5) A polymer prepared by polymerization according to the process of (1).

(6) The polymer according to (5), wherein the polymer has a glass transition point of −90 to −30° C. as measured by a differential scanning calorimeter.

(7) The polymer according to (5), wherein the polymer has a Mooney viscosity ($ML_{1+4}/100°$ C.) of 10 to 150.

(8) A rubber composition comprising 100 parts by weight of a rubber component and 10 to 100 parts by weight of filler, wherein the rubber component contains more than 30% by weight of the polymer of (5), the filler is selected from the group consisting of silica, carbon black, and a combination of silica and carbon black.

DETAILED DESCRIPTION OF THE INVENTION

The polymer of the present invention is obtained by a process comprising steps of polymerizing or copolymerizing a conjugated diene monomer by using an organolithium compound as an initiator in a hydrocarbon solvent, and thereafter allowing the active terminal of the polymer to react with a compound containing an imino group represented by the formula 1 mentioned above.

Examples of the conjugated diene monomer for use in the present invention include 1,3-butadiene, isoprene, 1,3-pentadiene, 2,3-dimethylbutadiene, 2-phenyl-1,3-butadiene, and 1,3-hexadiene. These may be used alone or in a combination of two or more of them. Among these monomers, 1,3-butadiene is preferable.

Examples of the vinyl aromatic hydrocarbon monomer for use in the copolymerization with the conjugated diene monomer include styrene, a-methylstyrene, 1-vinylnaphthalene, 3-vinyltoluene, ethylvinylbenzene, divinylbenzene, 4-cyclohexylstyrene, and 2,4,6-trimethylstyrene. Among these monomers, styrene is preferable.

When carrying out the copolymerization using a conjugated diene monomer and a vinyl aromatic hydrocarbon monomer, the monomers are preferably 1,3-butadiene and styrene, respectively, from a practical standpoint, that is, easy availability of the monomers and excellent anionic polymerization properties including living property.

Examples of the initiator for use in the polymerization include organolithium compounds. Preferably, these compounds are lithium compounds having 2 to 20 carbon atoms. Specific examples of these compounds include ethyllithium, n-propyllithium, i-propyllithium, n-butyllithium, secbutyllithium, t-octyllithium, n-decyllithium, phenyllithium, 2-naphthyllithium, 2-butyl-phenyllithium, 4-phenyl-butyllithium, cyclohexyllithium, 4-cyclopentyllithium, and a reaction product between diisopropenylbenzene and butyllithium.

The amount to be used of the initiator is normally 0.2 to 20 mmol based on 100 g of monomers.

The polymerization of the present invention is carried out in a solvent such as a hydrocarbon solvent that does not destroy the organolithium initiator. A suitable solvent is selected from an aliphatic hydrocarbon, an aromatic hydrocarbon, and an alicyclic hydrocarbon. Particularly preferred hydrocarbons are those having 3 to 8 carbon atoms. Preferred examples of the hydrocarbon include propane, n-butane, i-butane, n-pentane, i-pentane, n-hexane, cyclohexane, propene, 1-butene, i-butene, trans-2-butene, cis-2-butene, 1-pentene, 2-pentene, 1-hexene, 2-hexene, benzene, toluene, xylene, and ethylbenzene. These solvents may be used above or in a combination of two or more of them.

The monomer concentration in the solvent is normally 5 to 50% by weight and preferably 10 to 30% by weight. When carrying out a copolymerization between a conjugated diene monomer and a vinyl aromatic hydrocarbon monomer, the content of the vinyl aromatic hydrocarbon monomer in the monomer mixture charged into a reactor is preferably 3 to 50% by weight and more preferably 5 to 45% by weight.

In the present invention, a known randomizer may be used when an anionic polymerization of a conjugated diene monomer is carried out. The term "randomizer" is used herein to mean a compound which has a function to control the microstructure of a conjugated diene polymer, for example, the increase of the proportion of 1,2-linkage of butadiene portions of a butadiene polymer or in a butadiene portion of a butadiene-styrene copolymer or the increase of the proportion of the 3,4-linkage of an isoprene polymer, and to control the compositional distribution of monomer units in a copolymer composed of a conjugated diene monomer and a vinyl aromatic hydrocarbon monomer, for example, randomization of butadiene units or the styrene units in a butadiene-styrene copolymer. The randomizers for use in the present invention are not particularly limited and any randomizers generally used can also be used in the present invention. Examples of the randomizers include ethers such as dimethoxybenzene, tetrahydrofuran, dimethoxyethane, diethylene glycol dibutyl ether, diethylene glycol dimethyl ether, bis(tetrahydrofurylpropane), and tertiary amines such as trimethylamine, pyridine, N-methylmorpholine, N,N,N', N'-tetramethylethylenediamine, and 1,2-dipiperidinoethane. Further examples include potassium salts such as potassium-t-amylate and potassium-t-butoxide and sodium salts such as sodium-t-amylate.

The amount to be used of the randomizer is within the range of from 0.01 to 1000 molar equivalents per one mole of the organolithium compound.

The terminal modifier for use in the present invention needs to have an imino group in the molecule thereof. The imino group has a possibility to produce a good hydrogen bond with a variety of acidic functional groups, because the imino group has an strong basicity similar to that of a tertiary amino group and has a reduced steric hindrance in addition.

When an active terminal of a polymer is reacted with a terminal modifier, it is believed that what is obtained by the reaction is a mixture of products of a nucleophilic substitution with the alkoxysilyl group in the modifier molecule and a product of addition reaction to the imine group in the modifier molecule, as illustrated by the following formula 2. That is, when the polymer is compounded with a filler, it is expected that an interaction is produced between an acidic functional group on the surface of a filler and the introduced imino group in the case of the nucleophilic substitution with the terminal of a polymer, thereby allowing a good filler dispersing effect and a reinforcing effect at the same time. Further, in the case of the addition to the terminal of the polymer, the product is a secondary amine. In this case, the secondary amine is highly capable of forming a hydrogen bond with a silanol group which is expected to cause a good dispersion of silica.

Formula 2

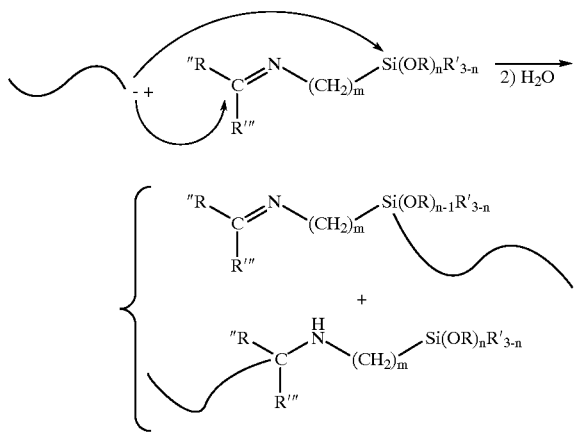

wherein R, R', R", and R'" each independently represents a group, having 1 to 18 atoms, selected from the group consisting of an alkyl group, an ally group and an aryl group; and m and n are integers of 1 to 20 and 1 to 3.

The terminal modifier for use in the present invention needs to have an alkoxysilyl group in the molecule thereof.

The alkoxysilyl group introduced into an end of the polymer chain performs a condensation reaction with the silanol group on the surface of silica. The synergism of this condensation reaction and the force of the above-mentioned hydrogen bond by the imino group can provide a very high reinforcing effect.

Besides, the terminal modifier for use in the present invention may have a dimethylaminobenzene structure as a substituent group of the imino group. In this case, because of the action of the functional group having a strong interaction with carbon black, a better reinforcing effect of the filler can be obtained.

As described above, the modified polymer exhibits good reinforcing characteristics in a rubber compound having a filler comprising a silica or a carbon black. Therefore, a rubber composition having good wear and fracture characteristics can be obtained.

Specific examples of the compounds having an imino group for use in the present invention include N-(1,3-dimethylbutylidene)-3-(triethoxysilyl)-1-propaneamine, N-(1-methylethylidene)-3-(triethoxysilyl)-1-propaneamine, N-ethylidene-3-(triethoxysilyl)-1-propaneamine, N-(1-methylpropylidene)-3-(triethoxysilyl)-1-propaneamine, and N-(4-N,N-dimethylaminobenzylidene)-3-(triethoxysilyl)-1-propaneamine. Among these compounds, preferable are N-(1-methylpropylidene)-3-(triethoxysilyl)-1-propaneamine, N-(1,3-dimethylbutylidene)-3-(triethoxysilyl)-1-propaneamine, and the like.

The amount of the terminal modifier to be used in the present invention is normally 0.25 to 3.0 mol, preferably 0.5 to 1.5 mol, per one mole of the organo-alkali metal compound to be used as an initiator for the polymerization. An amount of less than 0.25 mol is not desirable because the alkoxy group is consumed in a coupling reaction if the amount of the terminal modifier is in this range. On the other hand, an amount of more than 3 moles is not desirable, because, in this range, an excess of the modifier becomes useless and the impurities in the modifier deactivate the active terminal of the anionic polymer to thereby lower the degree of substantial modification.

The reaction between the terminal modifier of the present invention and the polymer anion may be carried out by utilizing the temperature for the diene polymerization. More specifically, preferred temperatures range from 30 to 100° C. A temperature lower than 30° C. tends to bring about an excessively high viscosity of the polymer, whereas a temperature higher than 100° C. tends to deactivate the terminal anion undesirably.

Although the timing and method for adding the terminal modifier to the polymerization system chain are not particularly limited, generally such a modifier is added when the polymerization is completed.

The analysis of the modified group of the polymer chain terminal can be conducted by use of a high performance liquid chromatography (HPLC).

Preferably, the polymer or copolymer obtained has a glass transition point (Tg) of −90 to −30° C. as measured by DSC (Differential Scanning Calorimetry). It is difficult to obtain a polymer having a glass transition of below −90° C. by an ordinary anionic polymerization procedure. On the other hand, a polymer having a glass transition of above −30° C. is hard at a temperature in a room temperature range that its use as a rubber composition is somewhat inconvenienced.

The Mooney viscosity ($ML_{1+4}$/100° C.) of the polymer in the present invention is preferably 10 to 150 and more preferably 15 to 70. When the Mooney viscosity is less than 10, physical properties of the resulting rubber composition including fracture characteristics may be insufficient. On the other hand, when the Mooney viscosity is more than 150, the processability of the polymer becomes poor and it is sometimes difficult to knead the polymer with ingredients to be added.

Although a polymerization reaction to prepare the polymer of the present invention can be carried out at any temperature, within the range of from −80 to 150° C., is preferable and a temperature within the range of from −20 to 100° C. is more preferable. A polymerization reaction can be carried under a pressure generated by the reaction. It is normally desirable to carry out the reaction under a pressure sufficient to keep the monomers substantially in a liquid phase. That is, the pressure for the polymerization reaction depends on the substances to be polymerized, diluents to be used, and polymerization temperatures, and a higher pressure can be employed if desired. Such a pressure can be obtained by an appropriate method, for example, pressurizing the reactor by a gas inert to the polymerization reaction.

Generally, it is advantageous to remove water, oxygen, carbon dioxide, and other catalyst poison from all of the materials, such as initiator, solvent, monomer, and the like, involved in the polymerization process.

In the present invention, the polymer can be used together with a rubber component conventionally used in tire industries. Examples of the rubber component that can be used together include natural rubber (NR) and diene-based synthetic rubbers. Examples of the diene-based synthetic rubbers include styrene/butadiene copolymers (SBR), polybutadiene (PB), polyisoprene (IR), butyl rubber (IIR), ethylene/propylene copolymers, and blends thereof. A rubber component, having a branched structure formed by use of a polyfunctional modifier such as tin tetrachloride, or a multifunctional monomer such as divinyl benzene may also be used.

The rubber composition of the present invention contains carbon black or silica, or alternatively, both of them as a reinforcing filler.

Kinds of the silica for use in the present invention are not particularly limited. Examples of the silica include wet-process silica (precipitated silica), dry-process silica (fumed silica), calcium silicate, and aluminum silicate. Among these kinds, precipitated silica is preferable, because this silica exhibits remarkable effects on the improvement of fracture characteristics and on the simultaneous achievement of wet-grip property and low rolling resistance.

Kinds of the carbon black for use in the present invention are not particularly limited, either. Examples of the carbon black that can be used include FEF (Fast Extruding Furnace), SRF (Semi Reinforcing Furnace), HAF (High Abrasion Furnace), ISAF (Intermediate Super Abrasion Furnace), and SAF (Super Abrasion Furnace). Preferred carbon black is one whose iodine absorption (IA) is 60 mg/g or more and dibutyl phthalate (DBP) absorption is 80 mL/100 g or more. The use of the carbon black enhances the effects on the improvement of physical properties of the rubber composition. In particular, the use of HAF, ISAF, and SAF is preferable because of the excellence thereof in improving wear resistance.

The amount of the filler compounded in the rubber composition is not particularly limited, but preferably, it is within the range of 10 parts by weight and 100 parts by weight per 100 parts by weight of rubber component (phr), and more preferably, between 20 to 80 phr, form the standpoint of reinforcing property and improvement of physical properties of the rubber composition. When the amount is little, the fracture characteristics of the rubber composition may not be sufficient, and when the amount if a lot, the processability of the rubber composition maybe poor.

When silica is used as a filler in the polymer composition of the present invention, a silane coupling agent can be used so as to further increase the reinforcing property at the time when the silica is incorporated. Examples of the silane coupling agent include bis(3-triethoxysilylpropyl) tetrasulfide, bis(2-triethoxysilylethyl) tetrasulfide, bis(3-trimethoxysilylpropyl) tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-nitropropyltrimethoxysilane, 3-nitropropyltriethoxysilane, 3-chloropropyltrimethoxysilane, 3-chloropropyltriethoxysilane, 2-chloroethyltrimethoxysilane, 2-chloroethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazole tetrasulfide, 3-triethoxysilylpropylbenzothiazole tetrasulfide, 3-triethoxysilylpropylmethacylate monosulfide, 3-trimethoxysilylpropylmethacylate monosulfide, bis(3-diethoxymethylsilylpropyl) tetrasulfide, 3-mercaptopropyldimethoxymethylsilane, 3-nitropropyldimethoxymethylsilane, 3-chloropropyldimethoxymethylsilane, dimethoxymethylsilylpropyl-N,N-dimethylthiocarbamoyl tetrasulfide, and dimethoxymethylsilylpropylbenzothiazole tetrasulfide. Among these compounds, bis(3-triethoxysilylpropyl) tetrasulfide, 3-trimethoxysilylpropylbenzothiazole tetrasulfide, and the like are preferable from the standpoint of improvement of reinforcing property.

The polymer of the present invention has, in the molecule thereof, a functional group having a high affinity for silica. Therefore, even when the content of a silane coupling agent, which is expensive, in a rubber composition is lower than a conventional content, the use of the polymer of the present invention enables the rubber composition to exhibit physical properties competitive with those of conventional ones. Further, the use of the polymer of the present invention can prevent the gelation of the rubber composition at the time of kneading thereof and therefore the processability in kneading becomes better. Although the preferred amount to be used differs depending on the kind of the silane coupling agent, the amount of the silica, and others, the amount is 1 to 20% by weight, preferably 5 to 15% by weight, based on the amount of the silica from the standpoint of reinforcing effect.

Examples of a vulcanizing agent include sulfur and the like. The amount, calculated as sulfur, of the vulcanizing agent to be used is preferably 0.1 to 10.0 parts by weight, more preferably 1.0 to 5.0 parts by weight, based on 100 parts by weight of the rubber component. When the amount is less than 0.1 part by weight breaking strength, wear resistance, and low exothermicity may be insufficient, whereas when the amount is more than 10.0 parts by weight the rubber composition shows poor rubber elasticity.

Examples of the process oil usable in the rubber composition of the present invention include paraffin-based oils, naphthene-based oils, and aromatic-based oils. Aromatic-based oils are used in the applications where tensile strength and wear resistance are important, while naphthene-based oils or paraffin-based oils are used in the applications where low hysteresis loss property and properties at low temperatures are important. The amount to be used of the process oil is preferably 0 to 100 parts by weight based on 100 parts by weight of the rubber component. An amount of more than 100 parts by weight tends to degrade breaking strength, wear resistance, and low exothermicity.

The vulcanization accelerators usable in the present invention are not particularly limited. Examples of the preferred vulcanization accelerator include thiazole-based ones, such as M(2-mercaptobenzothiazole), DM(dibenzothiazyl disulfide), and CZ(N-cyclohexyl-2-benzothiazyl sulphenamide), and guanidine-based ones such as DPG(diphenylguanidine). The amount to be used of the vulcanization accelerator is preferably 0.1 to 5.0 parts by weight, more preferably 0.2 to 3.0 parts by weight, based on 100 parts by weight of the rubber component.

The rubber composition of the present invention may contain additives which are conventionally used in rubber industries such as an antioxidant, zinc oxide, stearic acid, an oxidation inhibitor, and an antiozonant.

The rubber composition of the present invention is obtained by milling the ingredients using a kneading apparatus such as a roll mill, an internal mixer, and the like. After being shaped, the rubber composition is vulcanized. The rubber composition of the present invention can be used in tires, such as tire tread, under tread, carcass, side wall, and beads, and in other industrial applications such as rubber cushions, belts, and hoses. Among these uses, the rubber composition of the present invention is particularly suitable as a rubber composition for tire tread.

EXAMPLES

In order to further illustrate the present invention, the following specific examples are given. It should be understood that the examples are not limitative as long as it departs from the spirit of the present invention.

In the examples, parts and % mean parts by weight and % by weight, respectively, unless otherwise specified. Measurements were conducted according to the following methods.

(1) Physical Properties of the Polymers

The measurement of the number average molecular weight (Mn) and weight average molecular weight (Mw) of polymers was carried out by means of gel permeation chromatography [GPC; HLC-8020 manufactured by Toso Co., Ltd. using column GMH-XL (two columns in series) manufactured by Toso Co., Ltd.], wherein the molecular weights were obtained based on monodispersed polystyrene as a standard substance using differential refractive index (RI).

The Mooney viscosity of polymers was measured at 100° C. by means of model RLM-01 tester manufactured by Toyo Seiki Co., Ltd in accordance with JIS K6300-1994.

The microstructure of butadiene portions of polymers was elucidated by means of infrared spectroscopy (Molero method).

The amount of combined styrene in polymers was calculated from integrated percentage of $^1$H-NMR spectrum.

The glass transition point (Tg) of polymers was measured by means of a differential scanning calorimeter (DSC) Model 7 manufactured by Perkin-Elmer Corp., wherein the sample was first cooled to −100° C. and thereafter heated at a rate of 10° C./minute.

(2) Physical Properties of Rubber Compositions (a) Low Exothermicity

The value of tan δ (50° C.) was measured at 50° C., a strain of 5%, and a frequency of 15 Hz by means of a viscoelasticity measuring apparatus (manufactured by Rheometric Corp.). The smaller the tan δ (50° C.), the lower the exothermicity.

(b) Wet Property

Wet grip characteristics were measured by means of a Stanley-London type portable skid tester. The results were expressed in indices by taking the value of the control as 100. The greater the index, the better the performance.

(c) Fracture Characteristics

Tensile strength at the time of cutting (Tb), elongation at the time of cutting (Eb), and tensile stress at 300% elongation ($M_{300}$) were measured in accordance with JIS K6301-1995.

(d) Wear Resistance

Amount of wear at a slip rate of 60% at room temperature was measured by means of a Lambourne-type wear tester. The results were expressed in wear indices by taking the wear resistance of the control as 100. The greater the index, the better the wear resistance.

Preparation of Polymers

The materials for use in polymerization experiments were dried and purified unless otherwise specified.

A 800 mL pressure-proof glass vessel, after being dried and purged with nitrogen, was charged with 300 g of cyclohexane, 32.5 g of 1,3-butadiene monomer, 17.5 g of styrene monomer, 0.025 mmol of potassium-t-amylate, and 1 mmol of THF, and thereafter charged with 0.55 mmol of n-butyllithium (BuLi) After that, the reaction solution was subjected to polymerization at 50° C. for 3 hours. No precipitation was observed in the polymerization system and the system was homogeneous and transparent from the start to the completion of polymerization. The rate of conversion by polymerization was nearly 100%.

Part of the polymerization solution was taken out by way of sampling. The sample was added with isopropyl alcohol to produce a solid matter, which was collected and dried to obtain a rubbery polymer. The microstructure, molecular weight, and molecular weight distribution of the polymer were measured. The results are shown in Table 1.

The polymerization system was further added with 0.55 mmol of N-(1,3-dimethylbutylidene)-3-(triethoxysilyl)-1-propaneamine (DMBTESPA) as a terminal modifier and the system was allowed to react for further 30 minutes for the purpose of modification. After that, the polymerization system was further added with 0.5 mL of a 0.5% solution of 2,6-di-t-butylparacresol (BHT) in isopropanol so as to terminate the reaction. Then, a polymer A was obtained according to an ordinary procedure for drying. The values obtained by the analysis of the polymer are shown in Table 1.

Polymers B to I were obtained by changing the amount of n-butyllithium and the kind and amount of the modifier according to those shown in Table 1.

As with the polymer A, the microstructure, molecular weight, and molecular weight distribution of the polymers B to I were measured. The results are shown in Table 1.

TABLE 1

| Polymer | | A | B | C | D | E | F | G | H | I |
|---|---|---|---|---|---|---|---|---|---|---|
| Amount of n-BuLi (mmol) | | 0.55 | 0.55 | 0.55 | 0.55 | 0.55 | 0.55 | 0.45 | 0.55 | 0.55 |
| Kind of terminal modifier | | DMBTESPA | METESPA | ETMSPA | MPTESPA | DMABTESPA | TTC | None | TEOS | DMPT |
| Amount of terminal modifier (mmol) | | 0.55 | 0.55 | 0.55 | 0.55 | 0.55 | 0.45 | 0 | 0.55 | 0.55 |
| Molecular weight | Base Mw | 18.0 | 17.5 | 19.5 | 18.0 | 19.0 | 21.5 | 23.0 | 19.0 | 19.0 |
| | Total Mw | 27.0 | 27.6 | 30.0 | 31.0 | 28.0 | 68.0 | 23.0 | 33.0 | 31.0 |
| | Mw/Mn | 1.4 | 1.3 | 1.3 | 1.2 | 1.3 | 1.6 | 1.1 | 1.3 | 1.3 |
| Microstructure | Styrene content % | 35.0 | 35.6 | 35.2 | 35.4 | 34.6 | 35.0 | 34.9 | 35.8 | 35.6 |
| | Vinyl content % | 23 | 24 | 23 | 25 | 24 | 22 | 22 | 24 | 21 |
| Glass transition point (° C.) | | −40.0 | −42.0 | −40.0 | −40.0 | −39.0 | −40.2 | −40.0 | −38.0 | −39.0 |
| Mooney viscosity | | 34.0 | 36.0 | 34.0 | 37.0 | 34.0 | 103.0 | 31.0 | 37.0 | 36.0 |

Base Mw: molecular weight (Mw) before modification reaction
Total Mw: molecular weight (Mw) after modification reaction
Mw/Mn: molecular weight distribution after modification reaction
METESPA: N-(1-methylethylidene)-3-(triethoxysilyl)-1-propaneamine
ETMSPA: N-ethylidene-3-(triethoxysilyl)-1-propaneamine
MPTESPA: N-(1-methylpropylidene)-3-(triethoxysilyl)-1-propaneamine
DMBTESPA: N-(1,3-dimethylbutylidene)-3-(triethoxysilyl)-1-propaneamine
DMABTESPA: N-(4-,N,N-dimethylaminobenzylidene)-3-(triethoxysilyl)-1-propaneamine
TTC: tin tetrachloride
TEOS: tetraethoxysilane
DMPT: 3-dimethylaminopropyltriethoxysilane A 800 mL pressure-proof glass vessel, after being dried and purged with nitrogen, was charged with 300 g of cyclohexane, 40 g of 1,3-butadiene monomer, 10 g of styrene monomer, and 0.16 mmol of di-tetrahydrofurylpropane, and thereafter charged with 0.55 mmol of n-butyllithium (BuLi). After that, the reaction solution was subjected to polymerization at 50° C. for 2 hours. No precipitation was observed in the polymerization system and the system was homogeneous and transparent from the start to the completion of polymerization. The rate of conversion by polymerization was nearly 100%.

Part of the polymerization solution was taken out by way of sampling. The sample was added with isopropyl alcohol to produce a solid matter, which was collected and dried to obtain a rubbery polymer. The microstructure, molecular weight, and molecular weight distribution of the polymer were measured. The results are shown in Table 2.

The polymerization system was further added with 0.55 mmol of N-(1,3-dimethylbutylidene)-3-(triethoxysilyl)-1-propaneamine as a terminal modifier and the system was allowed to react for further 30 minutes for the purpose of modification. After that, the polymerization system was further added with 0.5 mL of a 0.5% solution of 2,6-di-t-butylparacresol (BHT) in isopropanol so as to terminate the reaction. Then, a polymer J was obtained according to an ordinary procedure for drying. The values obtained by the analysis of the polymer are shown in Table 2.

Polymers K to N were obtained by changing the amount of n-butyllithium and the kind and amount of the modifier according to those shown in Table 2.

As with the polymer L, the microstructure, molecular weight, and molecular weight distribution of the polymers K to N were measured. The results are shown in Table 2.

TABLE 2

| Polymer | | J | K | L | M | N |
|---|---|---|---|---|---|---|
| Amount of n-BuLi (mmol) | | 0.55 | 0.55 | 0.45 | 0.45 | 0.45 |
| Kind of terminal modifier | | DMBTESPA | DMABTESPA | TTC | None | TEOS |
| Amount of terminal modifier (mmol) | | 0.55 | 0.55 | 0.45 | 0.45 | 0.45 |
| Molecular weight | Base Mw | 19.0 | 18.7 | 21.5 | 23.0 | 22.3 |
| | Total Mw | 26.8 | 27.1 | 67.0 | 23.0 | 24.0 |
| | Mw/Mn | 1.3 | 1.3 | 1.6 | 1.1 | 1.1 |
| Microstructure | Styrene content % | 20.1 | 20.0 | 20.0 | 20.0 | 21.0 |
| | Vinyl content % | 54 | 57 | 56 | 57 | 55 |
| Glass transition point (° C.) | | −42.0 | −43.0 | −40.0 | −40.0 | −39.0 |
| Mooney viscosity | | 32.0 | 38.0 | 78.0 | 24.0 | 31.0 |

Base Mw: molecular weight (Mw) before modification reaction
Total Mw: molecular weight (Mw) after modification reaction
Mw/Mn: molecular weight distribution after modification reaction
ETMSPA: N-ethylidene-3-(triethoxysilyl)-1-propaneamine
DMBTESPA: N-(1,3-dimethylbutylidene)-3-(triethoxysilyl)-1-propaneamine
DMABTESPA: N-(4-,N,N-dimethylaminobenzylidene)-3-(triethoxysilyl)-1-propaneamine
TTC: tin tetrachloride
TEOS: tetraethoxysilane
DMPT: 3-dimethylaminopropyltriethoxysilane A 800 mL pressure-proof glass vessel, after being dried and purged with nitrogen, was charged with 300 g of cyclohexane, 50 g of 1,3-butadiene monomer, and 1 mmol of tetrahydrofuran (THF), and thereafter charged with 0.55 mmol of n-butyllithium (BuLi). After that, the reaction solution was subjected to polymerization at 50° C. for 2 hours. No precipitation was observed in the polymerization system and the system was homogeneous and transparent from the start to the completion of polymerization. The rate of conversion by polymerization was nearly 100%.

Part of the polymerization solution was taken out by way of sampling. The sample was added with isopropyl alcohol to produce a solid matter, which was collected and dried to obtain a rubbery polymer. The microstructure, molecular weight, and molecular weight distribution of the polymer were measured. The results are shown in Table 3.

The polymerization system was further added with 0.55 mmol of N-(1,3-dimethylbutylidene)-3-(triethoxysilyl)-1-propaneamine (DMBTESPA) as a terminal modifier and the system was allowed to react for further 30 minutes for the purpose of modification. After that, the polymerization system was further added with 0.5 mL of a 0.5% solution of BHT in isopropanol so as to terminate the reaction. Then, a polymer W was obtained according to an ordinary procedure for drying the polymer. The values obtained by the analysis of the polymer are shown in Table 3.

Polymers P and Q were obtained by changing the amount of n-butyllithium and the kind and amount of the modifier according to those shown in Table 2.

TABLE 3

| Polymer | | O | P | Q |
|---|---|---|---|---|
| Amount of n-BuLi (mmol) | | 0.55 | 0.45 | 0.45 |
| Kind of terminal modifier | | DMBTESPA | TCC | None |
| Amount of terminal modifier (mmol) | | 0.55 | 0.45 | 0.55 |
| Molecular weight | Base Mw | 19.0 | 23.5 | 24.2 |
| | Total Mw | 27.8 | 52.3 | 25.3 |
| | Mw/Mn | 1.3 | 1.7 | 1.1 |
| Microstructure | Styrene content % | 0.0 | 0.0 | 0.0 |
| | Vinyl content % | 12 | 11 | 13 |
| Glass transition point (° C.) | | −86.0 | −84.0 | −84.0 |
| Mooney viscosity | | 34.0 | 75.0 | 27.0 |

Base Mw: molecular weight (Mw) before modification reaction
Total Mw: molecular weight (Mw) after modification reaction
Mw/Mn: molecular weight distribution after modification reaction
TTC: tin tetrachloride
TEOS: tetraethoxysilane Meanwhile, when the polymerization was completed for polymers G, M, and Q, the modification reaction was not carried out and the polymerization was terminated by the addition of 0.5 mL of a 0.5% solution of BHT in isopropanol. Then, the polymers G, M, and Q were obtained according to an ordinary procedure for drying.

Preparation of Rubber Compositions

By using the polymers obtained in the above-described procedures, rubber compositions using carbon black and/or silica as a filler were prepared based on the formulations shown in Table 4. Physical properties of the rubber compositions were assessed.

Examples 1 to 6 and Comparative Examples 1 to 4

By using the polymers A to I, rubber compositions were prepared based on the formulation 1 (the filler was silica alone) shown in Table 4. Physical properties of the rubber compositions were assessed. The results are shown in Table 5-1. Wet property and wear characteristics were assessed by using Comparative Example 1 (polymer G) as control.

TABLE 4

| | | Formulation 1 | Formulation 2 | Formulation 3 |
|---|---|---|---|---|
| Masterbatch | Polymer of the present invention | 100 | 100 | 70 |
| | NR | 0 | 0 | 30 |
| | Carbon black | 0 | 50 | 27 |
| | Silica | 55 | 0 | 27 |
| | Coupling agent | 0 | 0 | Varied |
| | Aroma oil | 10 | 10 | 10 |
| | Stearic acid | 2 | 2 | 2 |
| | 6C | 1 | 1 | 1 |
| Final batch | ZnO | 3 | 3 | 3 |
| | DPG | 0.5 | 0.5 | 0.5 |
| | DM | 1 | 0.5 | 1 |
| | NS | 1 | 0.5 | 1 |
| | Sulfur | 3 | 1.3 | Varied |

Silica: Niposil AQ manufactured by Nippon Silica Industry Co., Ltd.
Coupling agent: bis(3-triethoxysilylpropyl) tetrasulfide, trade name Si69 manufactured by Degsa Ag.
6C: N-(1,3-dimethylbutyl)-N'-phenyl-p-phenylenediamine
DPC: diphenylguanidine
DM: mercaptobenzothiazyl disulfide
NS: N-t-butyl-2-benzothiazyl sulphenamide

TABLE 5-1

| | | | | | | | Comparative | Comparative | Comparative | Comparative |
|---|---|---|---|---|---|---|---|---|---|---|
| | | Example 1 | Example 2 | Example 3 | Example 4 | Example 5 | Example 1 | Example 2 | Example 3 | Example 4 |
| Copolymer | | A | B | C | D | E | F | G | H | I |
| Fracture characteristics | HD | 72 | 72 | 70 | 71 | 72 | 71 | 73 | 73 | 73 |
| | Tb (Mpa) | 21.6 | 20.0 | 20.1 | 20.5 | 21.0 | 19.6 | 16.3 | 19.2 | 20.1 |
| | Eb (%) | 541 | 553 | 561 | 495 | 486 | 436 | 440 | 478 | 509 |
| | $M_{300}$ | 6.2 | 6.6 | 6.8 | 6.3 | 6.4 | 5.1 | 5.0 | 5.6 | 6.0 |
| Low exothermicity | | 0.110 | 0.109 | 0.112 | 0.113 | 0.110 | 0.147 | 0.148 | 0.137 | 0.128 |
| Wet property | | 98 | 100 | 99 | 102 | 101 | 98 | 100 | 101 | 100 |
| Wear characteristics | | 123 | 120 | 118 | 123 | 121 | 101 | 100 | 110 | 119 |

Silica

Examples 6 to 10 and Comparative Examples 5 to 8

By using the polymers A to I as in previous experiments, rubber compositions were prepared based on the formulation 2 (the filler was carbon black alone) shown in Table 4. Physical properties of the rubber compositions were assessed. The results are shown in Table 5-2. Wet property and wear characteristics were assessed by using Comparative Example 6 (polymer G) as control.

systems using silica as a filler. The rubber compositions of Comparative Examples 3 and 4 as well as of Comparative Examples 7 and 8, using, respectively, polymers H and I each modified with an alkoxysilane, are entirely ineffective in terms of the low exothermicity and wear characteristics in systems using carbon black as a filler. In addition, even though these rubber compositions are more effective than the rubber compositions using unmodified polymers or polymers modified with a tin compound, the effect of these rubber compositions is slight even in systems using silica as

TABLE 5-2

Carbon black

|  |  | Example 6 | Example 7 | Example 8 | Example 9 | Example 10 | Comparative Example 5 | Comparative Example 6 | Comparative Example 7 | Comparative Example 8 |
|---|---|---|---|---|---|---|---|---|---|---|
| Copolymer |  | A | B | C | D | E | F | G | H | I |
| Fracture | HD | 63 | 63 | 63 | 63 | 62 | 62 | 64 | 64 | 63 |
| characteristics | Tb (Mpa) | 21.6 | 20.0 | 20.1 | 20.5 | 22.3 | 22.3 | 19.6 | 19.8 | 20.2 |
|  | Eb (%) | 423 | 438 | 425 | 415 | 411 | 405 | 441 | 458 | 428 |
|  | $M_{300}$ | 10.6 | 10.5 | 10.8 | 11.0 | 11.9 | 11.3 | 10.6 | 10.4 | 10.9 |
| Low exothermicity |  | 0.138 | 0.135 | 0.136 | 0.129 | 0.123 | 0.127 | 0.168 | 0.175 | 0.142 |
| Wet property |  | 99 | 98 | 99 | 100 | 100 | 98 | 100 | 103 | 100 |
| Wear characteristics |  | 102 | 104 | 103 | 106 | 116 | 110 | 100 | 99 | 103 |

In comparison with the rubber compositions of Comparative Example 2 or Comparative Example 6, each using an unmodified diene polymer G, the rubber compositions of Examples 1 to 5 using conjugated diene polymers A to E of the present invention, each containing both of an alkoxysilyl group and an amino group at the end of the polymer chain, have both wear characteristics and low exothermicity improved without impairment of fracture characteristics and wet property, in systems using silica as a filler as well as in systems using carbon black as a filler. In particular, what is worth an attention is that, in systems using carbon black as a filler, the above-mentioned rubber compositions of the present invention exhibit nearly the same effect as that of the rubber composition using the polymer F modified with a tin compound hitherto known as a very effective compound. Meanwhile, according to Comparative Examples 1 and 5 using the polymer F modified with tin tetrachloride, although satisfactory effects in terms of the low exothermicity and wear characteristics are observed in systems using carbon black as a filler, entirely no such effect is observed in a filler in comparison with the effect of the rubber compositions using the polymers of the present invention.

As can be seen from the above-described results, although a polymer modified according to a conventional technique is effective only to a silica-based filler or effective only to carbon black, the modified polymer of the present invention exhibits excellent dispersing effect, which is evident from good low exothermicity, and excellent reinforcing effect, which is evident from good wear characteristics, with respect to both of the fillers.

Examples 11 to 16 and Comparative Examples 9 to 17

By using the polymers J to N, rubber compositions were prepared based on the formulation 3 (the filler was a combination of silica and carbon black) shown in Table 4. Physical properties of the rubber compositions were assessed. The results are shown in Table 6. Wet performance and wear characteristics were assessed by using Comparative Example 10, which used a rubber composition containing a polymer M, as control.

TABLE 6

|  | Example 11 | Example 12 | Comparative Example 9 | Comparative Example 10 | Comparative Example 11 |
|---|---|---|---|---|---|
| Copolymer of the present invention | J | K | L | M | N |
| Si69 (phr) | 2.5 | 2.5 | 2.5 | 2.5 | 2.5 |
| Sulfur (phr) | 1.5 | 1.5 | 1.5 | 1.5 | 1.5 |
| Fracture HD | 67 | 66 | 69 | 70 | 68 |
| characteristics Tb | 21.8 | 22.0 | 18.7 | 18.9 | 18.2 |
| Eb | 357 | 359 | 345 | 343 | 342 |
| $B_{300}$ | 14.2 | 14.8 | 12.8 | 13.2 | 13.8 |
| Low exothermicity | 0.108 | 0.099 | 0.139 | 0.155 | 0.142 |
| Wet property | 101 | 102 | 100 | 100 | 97 |
| Wear characteristics | 110 | 109 | 102 | 100 | 104 |

|  | Example 13 | Example 14 | Comparative Example 12 | Comparative Example 13 | Comparative Example 14 |
|---|---|---|---|---|---|
| Copolymer of the present invention | J | K | L | M | N |
| Si69 (phr) | 1.5 | 1.5 | 1.5 | 1.5 | 1.5 |
| Sulfur (phr) | 2.0 | 2.0 | 2.0 | 2.0 | 2.0 |

TABLE 6-continued

| Fracture characteristics | HD | 68 | 69 | 71 | 71 | 69 |
|---|---|---|---|---|---|---|
|  | Tb | 19.1 | 19.2 | 18.1 | 18.1 | 18.8 |
|  | Eb | 351 | 340 | 311 | 321 | 325 |
|  | $M_{300}$ | 12.4 | 13.2 | 11 | 9 | 10.1 |
| Low exothermicity | | 0.115 | 0.103 | 0.142 | 0.151 | 0.148 |
| Wet property | | 100 | 101 | 100 | 100 | 99 |
| Wear characteristics | | 101 | 103 | 87 | 83 | 96 |

|  |  | Example 15 | Example 16 | Comparative Example 15 | Comparative Example 16 | Comparative Example 17 |
|---|---|---|---|---|---|---|
| Copolymer of the present invention | | J | K | L | M | N |
| Si69 (phr) | | 0 | 0 | 0 | 0 | 0 |
| Sulfur (phr) | | 2.5 | 2.5 | 2.5 | 2.5 | 2.5 |
| Fracture characteristics | HD | 67 | 67 | 68 | 69 | 68 |
|  | Tb | 18.8 | 19.2 | 18.1 | 16.5 | 17.8 |
|  | Eb | 346 | 344 | 317 | 322 | 345 |
|  | $M_{300}$ | 10.3 | 10.4 | 8.4 | 7.8 | 8.8 |
| Low exothermicity | | 0.103 | 0.097 | 0.141 | 0.155 | 0.144 |
| Wet property | | 101 | 101 | 101 | 100 | 98 |
| Wear characteristics | | 95 | 99 | 98 | 75 | 91 | phr: parts by weight per 100 parts by weight of rubber component

As shown in Table 6, particularly excellent low exothermicity is obtained by the use of the rubber composition of the present invention regardless of the contents of the coupling agent, or even if no coupling agent is used, in the formulations containing as a filler a combination of carbon black and silica. In particular, in the systems in which no coupling agent in used, the rubber compositions of the present invention bring about remarkable improvement in both wear characteristics and low exothermicity, relative to the rubber compositions of Comparative Examples containing a polymer using a known modifier.

As for the content of the coupling agent, even when the content is reduced from 2.5 parts by weight to 0 part by weight based on 100 parts by weight of the rubber component, the rubber composition M of the present invention can prevent the wear characteristics from being deteriorated and provides nearly the same level of wear characteristics as that of the control rubber composition containing unmodified polymer and 2.5 parts by weight of the silane coupling agent.

Examples 17 and 18 and Comparative Examples 18 to 20

By using the polymers A, E, F, G, and H, rubber compositions were prepared based on the formulation 3 shown in Table 4. Physical properties of the rubber compositions were assessed. The results are shown in Table 7. Wet property and wear characteristics were assessed by using Comparative Example 20 (polymer G) as control.

TABLE 7

|  |  | Example 17 | Example 18 | Comparative Example 18 | Comparative Example 19 | Comparative Example 20 |
|---|---|---|---|---|---|---|
| Copolymer of the present invention | | A | E | F | G | H |
| Si69 (phr) | | 0.0 | 0.0 | 0.0 | 0.0 | 0.0 |
| Sulfur (phr) | | 2.5 | 2.5 | 2.5 | 2.5 | 2.5 |
| Fracture characteristics | HD | 68 | 67 | 69 | 72 | 71 |
|  | Tb | 22.6 | 22.9 | 19.8 | 20.4 | 21.2 |
|  | Eb | 395 | 385 | 412 | 422 | 435 |
|  | $M_{300}$ | 11.5 | 10.8 | 7.5 | 7.9 | 8.7 |
| Low exothermicity | | 0.115 | 0.105 | 0.165 | 0.149 | 0.142 |
| Wet property | | 100 | 101 | 99 | 100 | 97 |
| Wear characteristics | | 112 | 119 | 102 | 100 | 106 |

As will be seen from these results, the similar effects can be obtained even when the microstructure of the polymer changes.

Examples 19 and Comparative Examples 21 and 22

By using the polymers O, P, and Q, rubber compositions were prepared based on the formulation 3 (the filler was a combination of silica and carbon black) shown in Table 4. Physical properties of the rubber compositions were assessed. The results are shown in Table 8. Wet performance and wear characteristics were assessed by using Comparative Example 22 (polymer Q) as control.

TABLE 8

|  |  | Example 19 | Comparative Example 21 | Comparative Example 22 |
|---|---|---|---|---|
| Copolymer of the present invention | | O | P | Q |
| Si69 (phr) | | 0.0 | 0.0 | 0.0 |
| Sulfur (phr) | | 2.5 | 2.5 | 2.5 |
| Fracture | HD | 67 | 69 | 68 |

TABLE 8-continued

|  |  | Example 19 | Comparative Example 21 | Comparative Example 22 |
|---|---|---|---|---|
| characteristics | Tb | 16.9 | 15.1 | 13.6 |
|  | Eb | 309 | 358 | 325 |
|  | $M_{300}$ | 14.1 | 11.0 | 12.5 |
| Low exothermicity |  | 0.103 | 0.131 | 0.153 |
| Wet property |  | 99 | 100 | 100 |
| Wear characteristics |  | 123 | 103 | 100 |

As will be seen from these results, good low exothermicity and wear characteristics can by obtained by the use of the polymer of the present invention even if the main chain of the polymer comprises BR having a low glass transition point.

As will be seen from the above-described results, in the rubber compositions using the polymer of the present invention capable of exhibiting an interaction with both of the fillers, the low exothermicity is improved by good filler dispersing effect and the wear characteristics is improved by reinforcing effect, independently of the kinds and main chain structures of the polymer. This improvement is evident particularly in the system in which no silane coupling agent is used.

Further, a rubber composition using the polymer of the present invention, even when its content of the silane coupling agent is reduced, provides a better low exothermicity than that of the rubber composition using a polymer outside the scope of the present invention.

Since the present invention can provide a process for making a modified diene polymer and a polymer obtained by the process, which polymer has an enhanced interaction with both silica and carbon black, the use of the polymer enables the rubber composition to maintain the fracture characteristics, wear resistance, and low exothermicity of the rubber composition simultaneously at a highly satisfied level.

What is claimed is:

1. A process for manufacturing a polymer, said process comprising steps of polymerizing or copolymerizing a conjugated diene monomer by using an organolithium compound as an initiator in a hydrocarbon solvent and thereafter allowing the active terminal of the polymer to react with a compound having an imino group represented by the following formula 1:

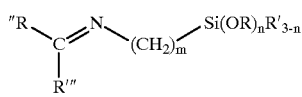

Formula 1 wherein R, R', R", and R'" each independently represents a group having 1 to 18 carbon atoms selected from the group consisting of an alkyl group, an allyl group, and an aryl group; and m and n are integers of from 1 to 20 and from 1 to 3, respectively.

2. A process for manufacturing a polymer according to claim 1, wherein the polymer is a copolymer of a conjugated diene monomer with a monovinyl aromatic compound.

3. A process for manufacturing a polymer according to claim 2, wherein the conjugated diene monomer and the monovinyl aromatic hydrocarbon monomer are butadiene and styrene, respectively.

4. A process for manufacturing a polymer according to claim 1, wherein the imino group is a group selected from the group consisting of ethylideneamino group, 1-methylpropylideneamino group, 1,3-dimethylbutylideneamino group, 1-methylethylideneamino group, and 4-N,N-dimethylaminobenzylideneamino group.

5. A polymer obtained by a process comprising steps of copolymerizing a conjugated diene monomer with a monovinyl aromatic hydrocarbon compound by using an organolithium compound as an initiator in a hydrocarbon solvent; and thereafter, allowing a chemically active terminal of a resulting polymer to react with a compound having an imino group and represented by following formula 1:

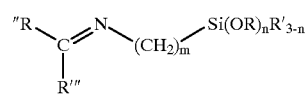

Formula 1 wherein R, R', R", and R'" each represent a group having 1 to 18 carbon atoms selected from the group consisting of: an alkyl group, an allyl group, and an aryl group; and m and n are integers of from 1 to 20 and from 1 to 3, respectively.

6. A polymer according to claim 5, wherein the polymer has a glass transition point of −90 to −30° C. as measured by a differential scanning calorimeter.

7. A polymer according to claim 5, wherein the polymer has a Mooney viscosity ($ML_{1+4}/100°$ C.) of 10 to 150.

8. A polymer according to claim 5, wherein the conjugated diene monomer is butadiene and the monovinyl aromatic hydrocarbon compound is styrene in the copolymerization.

9. A polymer according to claim 5, wherein the imino group is a group selected from the group consisting of: ethylideneamino group, 1-methylpropylideneamino group, 1,3-dimethylbutylideneamino group, 1-methylethylideneamino group, and 4-N,N-dimethylaminobenzylideneamino group.

10. A polymer according to claim 5, wherein the polymer has a glass transition point of −90 to −30° C. as measured by a differential scanning calorimeter.

11. A polymer according to claim 5, wherein the polymer has a Mooney viscosity ($ML_{1+4}/100°$ C.) of 10 to 150.

12. A rubber composition comprising 100 parts by weight of a rubber component and 10 to 100 parts by weight of a filler, wherein the rubber composition comprising at least 30% by weight of the polymer of claim 5 and the filler is selected from the group consisting of silica, carbon black, and a combination of a silica and a carbon black.

* * * * *